United States Patent [19]

Kitamura

[11] Patent Number: 4,713,887
[45] Date of Patent: Dec. 22, 1987

[54] XY TABLE

[75] Inventor: Koichiro Kitamura, Takaoka, Japan

[73] Assignee: Kitamura Machinery Co., Ltd., Takaoka, Japan

[21] Appl. No.: 930,459

[22] Filed: Nov. 14, 1986

[30] Foreign Application Priority Data

Nov. 20, 1985 [JP] Japan ................................ 60-258786

[51] Int. Cl.$^4$ .................... G01D 15/16; B43L 13/02
[52] U.S. Cl. ................................ 33/1 M; 33/18.1; 346/139 D
[58] Field of Search ............. 33/1 M, 18.1, 23.03, 33/26; 346/139 D

[56] References Cited

U.S. PATENT DOCUMENTS

| | | | |
|---|---|---|---|
| 2,618,860 | 11/1952 | Engelhart | 33/1 M |
| 2,981,123 | 4/1961 | McHugh | 33/1 M |
| 3,166,846 | 1/1965 | Pascoe et al. | 33/1 M |
| 3,639,990 | 2/1972 | McInnis et al. | 33/18.1 |
| 4,230,011 | 10/1980 | Battaglia | 33/1 M |
| 4,272,892 | 6/1981 | Rose | 33/1 M |
| 4,624,169 | 11/1986 | Nelson | 33/1 M |

FOREIGN PATENT DOCUMENTS

| | | | |
|---|---|---|---|
| 1473885 | 3/1969 | Fed. Rep. of Germany | 33/1 M |
| 218902 | 12/1984 | Japan | 33/1 M |
| 664638 | 1/1979 | U.S.S.R. | 33/1 M |

Primary Examiner—Richard R. Stearns
Attorney, Agent, or Firm—Vorys, Sater, Seymour and Pease

[57] ABSTRACT

An XY table for processing an object (22) such as an iron plate, comprising frame (2) having an opening formed thereby, a moving member (2) moving in an X-direction and in a Y-direction at a right angle to the X-direction, a head (21) for cutting, marking or machining attached to the moving means (20) for processing the object (22) through the opening, and a setting mechanism (23) for detachably setting the frame (2) to the object (22).

7 Claims, 4 Drawing Figures

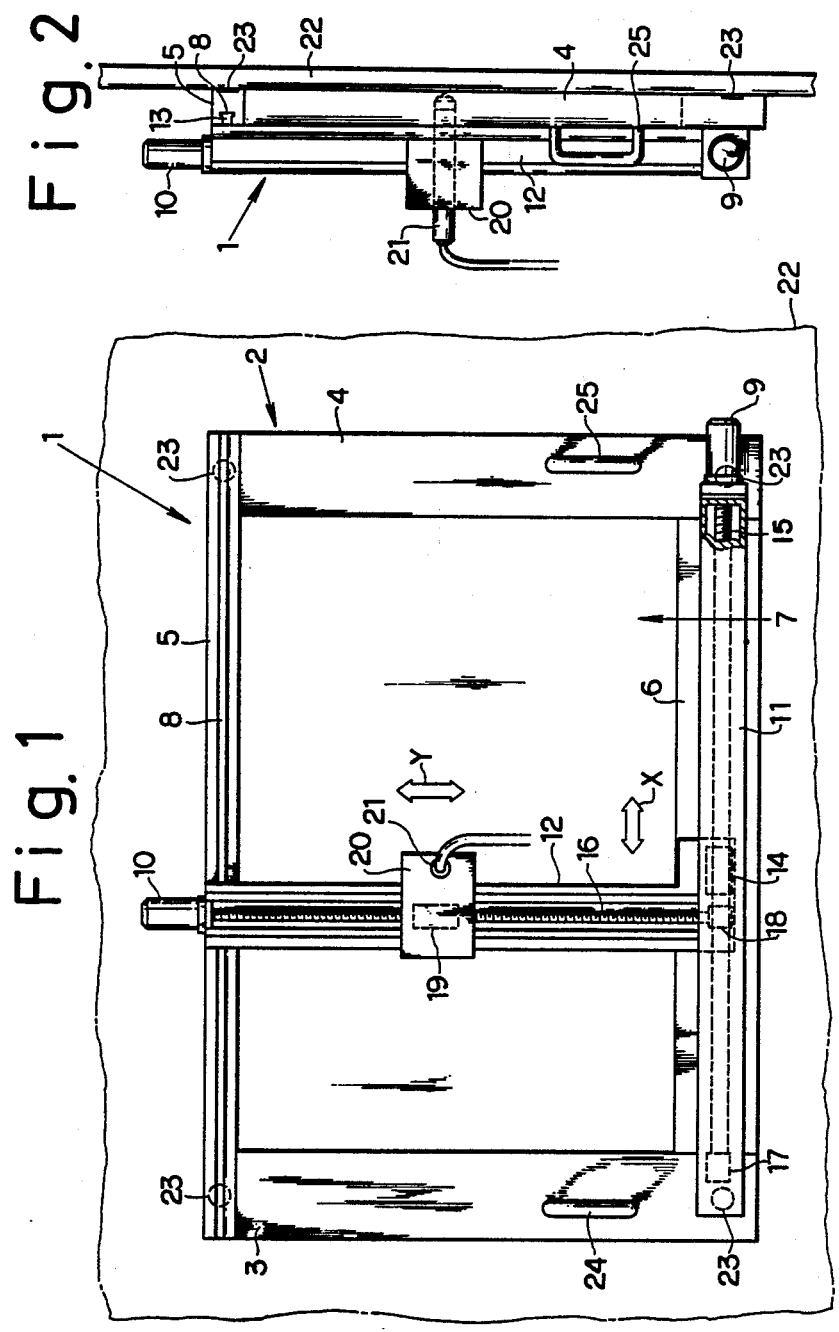

4,713,887

XY TABLE

BACKGROUND OF THE INVENTION

This invention relates to an improved XY table.

A plate or the like is cut along an imaginary line or a marked line for example, a thick iron plate cut by a gas torch or plasma torch. The cutting operation may be manual or automatic.

It is, however, not easy to handle a heavy iron plate. Also, a large iron plate can not be easily cut by a reasonable size of cutting machine.

SUMMARY OF THE INVENTION

The object of this invention is to provide an XY table which can be easily moved to a desired position for various operations.

Specifically, this invention includes an XY table for processing an object such as an iron plate comprising a frame having an opening formed thereby, a moving means moving in an X direction and in a Y direction at a right angle to the X direction, a head for cutting, marking or machining attached to the moving means for processing the object through the opening, and setting means for detachably setting the frame to the object.

BRIEF DESCRIPTION OF THE DRAWINGS

FIG. 1 is a front view showing an XY table according to the preferred embodiment of this invention;

FIG. 2 is a side view of the XY table as shown in FIG. 1;

DESCRIPTION OF THE PREFERRED EMBODIMENT

Figure 3:
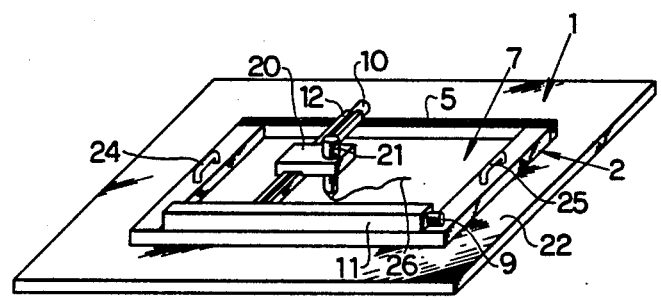
FIG. 3 is a perspective view of the XY table as shown in FIG. 1.

Referring to FIGS. 1 through 3, an XY table 1 having a frame 2 which comprises a pair of opposite side member 3, 4, a rail member 5 and a connection member 6. An opening is formed by the members 3, 4, 5 and 6.

A groove 8 is formed in the longitudinal direction of the rail member 5. A rail 11, in parallel with the rail member 5, is set on the members 3, 4, 6. The side members 3, 4 are in parallel to each other.

A movable rail 12 is set between the rail member 5 and the rail 11 so that the movable rail 12 is at a right angle to the rail member 5 and the rail 11. A projection 13 fixed to one end of the movable rail 12 is slidably set in the groove 8 of the rail member 5. The other end of the movable rail 12 is equipped with a nut 14.

A male screw member 15 extends in the longitudinal direction of the rail 11. One end of the male screw member 15 is joined to an output shaft of a servomotor 9. The other end of the screw member 15 is supported by a bearing 17. The nut 14 engages the male screw member 15. The nut 14 and the male screw member 15 can constitute a conventional ball screw.

The male screw member 15 is driven by a servomotor 9. In response to rotation of the male screw member 15, the nut 14 moves along the screw member 15 in the direction of the arrow X. The movable rail 12 can move along the rail member 5 and the rail 11 in the direction of the arrow X.

A screw shaft 16 longitudinally extends in the direction of the movable rail 12. One end of the screw shaft 16 is joined to an output shaft of a servomotor 10 and the other end is supported by a bearing 18. The screw shaft 16 is rotated by the servomotor 10 and engages a nut 19 so as to constitute a ball screw. The nut 16 is attached to a moving means 20. In response to rotation of the servomotor 10, the moving means 20 can move in the direction of the arrow Y at a right angle to the direction of the arrow X.

A working head 21 may be a head for a plasma cutting torch, a machining tool, marking-off means, or any other processing means. The head 21 is set in the moving means 20 so that the head 21 processes an object 22, such as an iron plate or the like.

Four setting means 23 are attached to a bottom portion of the frame 2 at its four corners. The setting means 23 are used to detachably set the frame 2 to the object 22. For example, when the object 22 is an iron plate, the setting means 23 can be formed of a magnet. Also, the setting means 23 can be formed of a suction type device.

A U-shaped handgrip 24 is fixed to the side member 3 while a U-shaped handgrip 25 is fixed to the side member 4, so that the XY table can be easily handled by an operator gripping the handgrips 24, 25.

Figure 4:
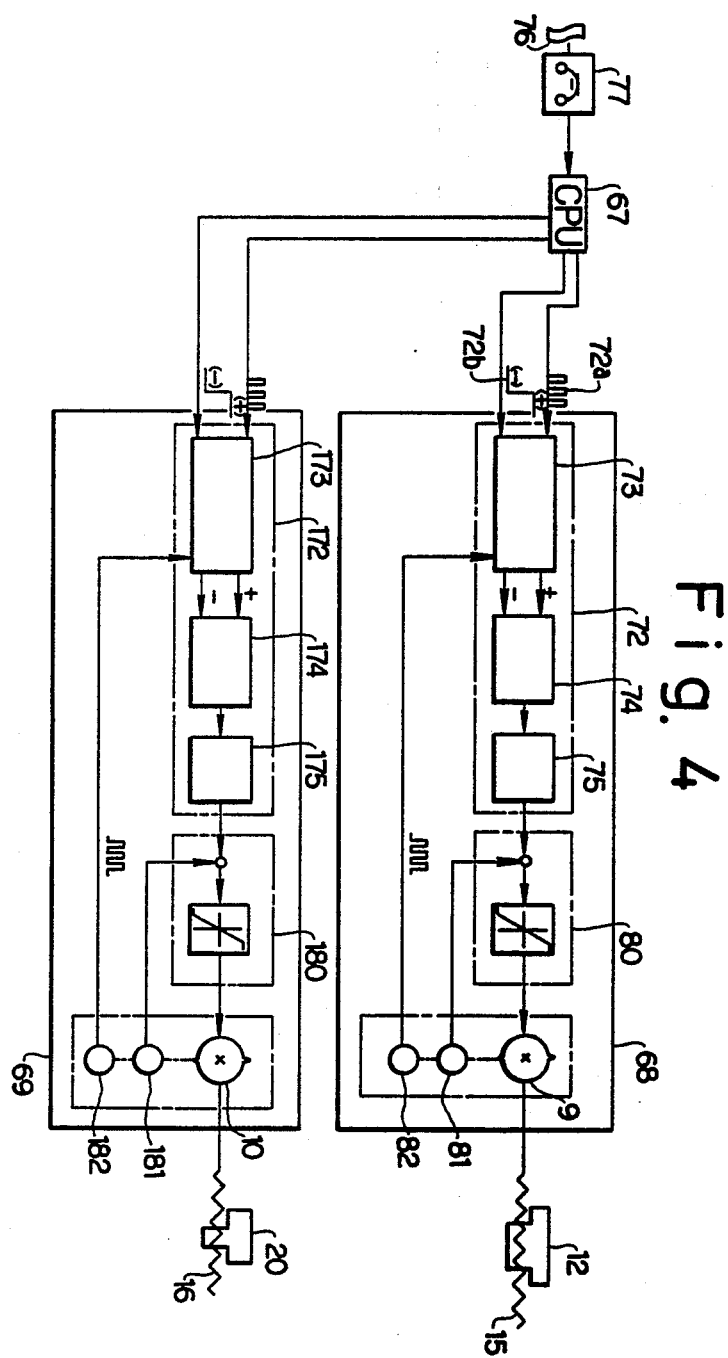
FIG. 4 is a block diagram of a control system for servomotors for use in the XY table as shown in FIG. 1.

Referring now to FIG. 4, a control system for the servomotors 9, 10 will be explained.

NC programs in an NC tape 76 are read by a tape reader 77 so as to send an input signal to a CPU 67. Servo means 68, for controlling the servomotor 9, is actuated in response to a signal sent from the CPU 67. Servo means 69, for controlling the servomotor 10, is actuated in response to a signal from the CPU 67. The servo means 68, 69 may be conventional ones. Therefore, only the servo means 68 will be briefly explained. Elements 72 to 75 and 80 to 82 in the servo means 68 correspond to elements 172 to 175 and 180 to 182 in the servo means 69, respectively.

A position control means 72 includes a pulse shaping-direction decision circuit 73, a deviation counter 74 and a D-A converter 75. The CPU 67 sends a moving command pulse or pulses 72a and a command signal or signals 72b for controlling a rotational direction of the servomotor 9. An output portion of the position control means 72 is connected to a speed control means 80 which is connected to the servomotor 9. An output shaft of the servomotor 9 is joined to a tachogenerator 81 and a pulse generator 82. The tachogenerator 81 is used to detect a rotational speed of the servomotor 9. The output voltage of the tachogenerator 81 is in proportion to the rotation speed thereof. The polarity of the output voltage depends on the rotation direction of the servomotor 9. The pulse generator 82 is used to detect the rotation angle of the servomotor 9. The number of the pulses produced by the pulse generator 82 is in proportion to the rotational angle thereof. The polarity of the output pulse depends on the rotational direction of the servomotor 9.

The tachogenerator 81 is connected to the speed control means 80. The pulse generator 82 is connected to the pulse shaping-direction decision circuit 73.

The deviation counter 74 produces an output signal which is an output voltage equal to the difference between the number of the moving command pulses 72a and the number of the moving feedback pulses fed back from the pulse generator 82. The output voltage is in proportion to the above-stated difference, and the polarity of the output voltage depends on the polarity of the above-stated difference.

As the output voltage is digital, after conversion by the D-A converter 75, it is sent to the speed control means 80 as a speed command voltage. The speed control means 80 compares the speed feedback voltage sent from the tachogenerator 81 with the speed command voltage. After the difference between those voltages is amplified, the speed of the servomotor 9 is controlled until the voltage difference therebetween becomes substantially zero.

When the servomotor 9 starts, the moving command pulse or pulses 72a are sent by way of the pulse shaping-direction decision circuit 73 to the deviation counter 74, and then the number of pulses is counted by the counter 74. This counted pulse number is converted into the speed command voltage by the D-A converter 75 and thereafter sent to the speed control means 80. As a result, the servomotor 9 begins to rotate. In response to the rotation of the servomotor 9, the pulse generator 82 produces a number of pulses in proportion to the rotational angle of servomotor 9. Those pulses are counted by the deviation counter 74. The number of the counted pulses in the deviation counter 74 is subtracted. If the moving command pulses 72a are continuously sent thereto, the servomotor 9 continues to rotate, and the deviation counter 74 holds a predetermined number of counted pulses. The rotation speed of the servomotor 9 is in proportion to the frequency of the moving command pulses 72a.

When input of the moving command pulse 72a stops, the servomotor 9 rotates only until the counted pulses in the deviation counter 74 become zero.

The servomotor 10 in the servo means 69 is controlled in the same manner as the servomotor 9.

In operation, an operator holds the hand grips 24, 25 and moves the XY table 1 onto the object 22, such as a thick iron plate. The working head 21 is attached to the moving means 20. A tip portion of the working head 21 is placed near the object 22. When a start button (not shown) is pushed, the NC tape 76 is read by the reader 77 thereby controlling the servomotors 9,10. The moving means 20 and the head 21 move in both directions of the arrows X and Y along a predetermined moving course 26 whereby the object 22 can be cut in a desired shape. After the cutting operation is finished, the operator again holds the hand grips 24, 25 and moves the XY table 1 from the object 22 to a desired place.

According to this invention, the XY table can be made in a very compact size. Therefore, it is easy to move the XY table to a desired position for various operations such as cutting or marking. Accordingly, even if a very large object, such as a heavy iron plate, is to be processed, an XY table according to this invention can be easily moved to the object. It should be noted that the object need not be moved.

If the setting means 23 is out of a magnet type or a suction type, the XY table 1 can be forceably placed in a desired position on the object 22, even if the object 22 is inclined or vertically positioned.

This invention is not limited to the above-mentioned embodiment only. For example, the working head 21 can be of any type including a torch head, a marking head, and a tool head. Examples of the tool head is a drill or an end mill. Also, a linear pulse motor can be used in place of a ball screw.

What is claimed is:

1. An XY table comprising:
   a frame (2) having a pair of first and second side members (3, 4), a connection member (6) for connecting one end of the first side member (3) with one end of the second side member (4) and a fixed rail member (5) one end of which is fixed to the other end of the first side member (3) and the other end of which is fixed to the other end of the second side member (4) in such a way that the first and second side members (3,4), the fixed rail member (5) and the connection member (6) are arranged in combination so as to increase rigidity of the frame (2);
   an auxiliary rail (11) fixed along the connection member (6) in parallel with the rail member (5), the auxiliary rail (11) extending between the first and second side members (3,4);
   a movable rail (12) slidable along the rail member (5) and the auxiliary rail (11) while the movable rail (12) is always at a right angle to both the rail member (5) and the auxiliary rail (11);
   a first nut (14) fixed to one end of the movable rail (12);
   a male screw member (15) engaging the first nut (14) and extending along the auxiliary rail (11);
   a first motor (9) placed at one end of the auxiliary rail (11) for rotating the male screw member (15) so that the nut (14) can move along the male screw member (15) between the first and second side members (3,4);
   a screw shaft (16) extending along the movable rail (12) between the rail member (5) and the auxiliary rail (11);
   a second motor (10) placed at the other end of the movable rail (12) for rotating the screw shaft (16);
   a second nut (19) engaging the screw shaft (16);
   a moving means (20) fixed to the nut (19) so as to move along the movable rail (12) between the rail member (5) and the auxiliary rail (11) when the second motor (10) rotates the screw shaft (16);
   a working head (21) attached to the moving means (20) for processing an object (22), such as a plasma cutting torch, a machining tool or marking-off means;
   setting means (23) fixed to the frame (2) for detachably setting the frame (2) to the object (22); and
   means (67, 68, 69, 76, 77) electrically connected to the first and second motors (9, 10) for controlling position of the working head (21).

2. an XY table as claimed in claim 1, further comprising a first handgrip (24) attached to the first side member (3) and a second handgrip (25) attached to the second side member (4) so that the XY table can be easily handled.

3. An XY table as claimed in claim 2, wherein the handgrips (24, 25) are formed in a U-shape.

4. An XY table as claimed in claim 2, wherein the setting means (23) is formed of a magnet type.

5. An XY table as claimed in claim 2, wherein the setting means (23) is formed of a suction type.

6. An XY table as claimed in claim 2, wherein a long groove (8) is formed in the rail member (5), and the movable rail (12) has a projection (13) slidable along the groove (8).

7. An XY table as claimed in claim 2, wherein the first nut (14) and the male screw member (15) constitute a ball screw mechanism.

* * * * *